United States Patent [19]

Okada et al.

[11] Patent Number: 5,031,056
[45] Date of Patent: Jul. 9, 1991

[54] TAPE TENSION MECHANISM

[75] Inventors: Hitoshi Okada; Katsuya Nozawa; Shinichiro Terada, all of Tokyo, Japan

[73] Assignee: Clarion Co., Ltd., Tokyo, Japan

[21] Appl. No.: 267,995

[22] Filed: Nov. 4, 1988

[30] Foreign Application Priority Data

Nov. 9, 1987 [JP] Japan .................................. 62-282585

[51] Int. Cl.⁵ ........................ G11B 5/027; G11B 15/48
[52] U.S. Cl. ...................................... 360/85; 360/74.3; 360/95
[58] Field of Search .................... 360/83, 84, 74.3, 85, 360/71, 137, 95; 242/75

[56] References Cited

U.S. PATENT DOCUMENTS

| 4,635,146 | 1/1987 | Koda et al. | 360/85 |
| 4,672,476 | 6/1987 | Saito et al. | 360/85 |
| 4,796,116 | 1/1989 | Kwon et al. | 360/95 X |
| 4,802,034 | 1/1989 | Matsumoto et al. | 360/85 |

Primary Examiner—Robert S. Tupper
Assistant Examiner—Andrew L. Sniezek
Attorney, Agent, or Firm—Flynn, Thiel, Boutell & Tanis

[57] ABSTRACT

In a tape player configured to wind a tape pulled out of a cassette onto a rotary head to play the tape, a tension mechanism includes a mode member to control the position of a tension control member according to a selected tape mode so as to establish relative contact between a tension member and a tape under a constant pressure in a play mode and separate them in a stop mode.

7 Claims, 4 Drawing Sheets

TAPE TENSION MECHANISM

FIELD OF THE INVENTION

This invention relates to a tape tension mechanism used for ensuring a constant contacting pressure between a tape and an outer surface of a rotary head in a tape player configured to wind the tape on the rotary head to play the tape.

BACKGROUND OF THE INVENTION

In a tape player such as video deck, digital audio tape player, etc. configured to wind a tape on a rotary head to play the tape, it is necessary that the tape contacts the rotary head under a constant pressure in a play mode.

As a tape tension mechanism for this purpose, there is an arrangement using a pivotable tension member biased by a spring force into contact with a tape surface to control movements of a supply reel in response to the pivoting position of the tension member. Such a tension member was positioned at an outer side of the tape path in old prior art devices. However, from the standpoint of reducing the size of the mechanism, a recently proposed arrangement positions it at an inner side of the tape path so that it moves ahead together with a tape loading block upon a tape loading operation.

In the above-indicated arrangement where the tension member is located in an inner side of the tape path, it requires the following different controls in play, stop and fast-winding modes.

That is, in the play mode, a biasing force of a spring is required in order to hold the tension member in contact with a tape under a constant pressure. In the stop mode, the tension member must be released in a direction away from the tape, slightly and not fully, because if it is released fully, it will get off a tape lead of the rotary head. Also in the fast-winding mode, the tension member must be released slightly. However, since the tension force in the fast-winding mode is larger than in the play mode and often overcome the energy of the spring for the tension member and therefore permits the tension member to rotate largely. In order to prevent the phenomenon a further control of the pivoting amount of the tension member is required.

However, in order to effect such different controls it is necessary to not only use a number of additional parts such as element for driving the tension member in the released direction in a certain mode, element for locking the tension member at a position, element for unlocking it from the position, etc. but also adjust motion timings of respective elements. Therefore, this invites an increase in the number of parts and a complicated structure.

OBJECT OF THE INVENTION

It is therefore an object of the invention to provide a tape tension mechanism which reliably controls a tension member in play, stop and fast-winding modes while using a small number of parts and simplifying the structure.

SUMMARY OF THE INVENTION

According to the invention, there is provided a tape tension mechanism including a mode member taking different positions corresponding to respective tape modes and a tension control member engaging the mode member to take a control position in stop and fast-winding modes and a non-control position in a play mode, and characterized in that the tension control member includes a control portion for controlling a tension member to move it in a direction away from a tape and a regulating portion for regulating the pivoting amount of the tension member in the direction away from the tape.

Under this inventive arrangement, the significantly simple structure merely using the mode member and the tension control member ensures reliable controls of the tension member in the play, stop and fast-winding modes.

More specifically, in the play mode, the tension control member takes the non-control position so that the tension member free from the tension control member is biased by a spring into contact with a tape under a constant pressure. In the stop mode, the tension control member takes the control position so that its control portion controls the tension member to move it in a direction away from the tape. In the fast-winding mode, the tension control member takes the control position so that its control portion controls the tension member to move it in the direction away from the tape as in the stop mode and its regulating portion regulates the pivoting amount of the tension member.

BRIEF DESCRIPTION OF THE DRAWINGS

FIG. 1 shows a play mode, FIG. 2 shows stop and fast-winding modes, FIG. 3 shows a tape unloading mode and FIG. 4 shows a tape unloaded mode.

DETAILED DESCRIPTION

Figure 1:
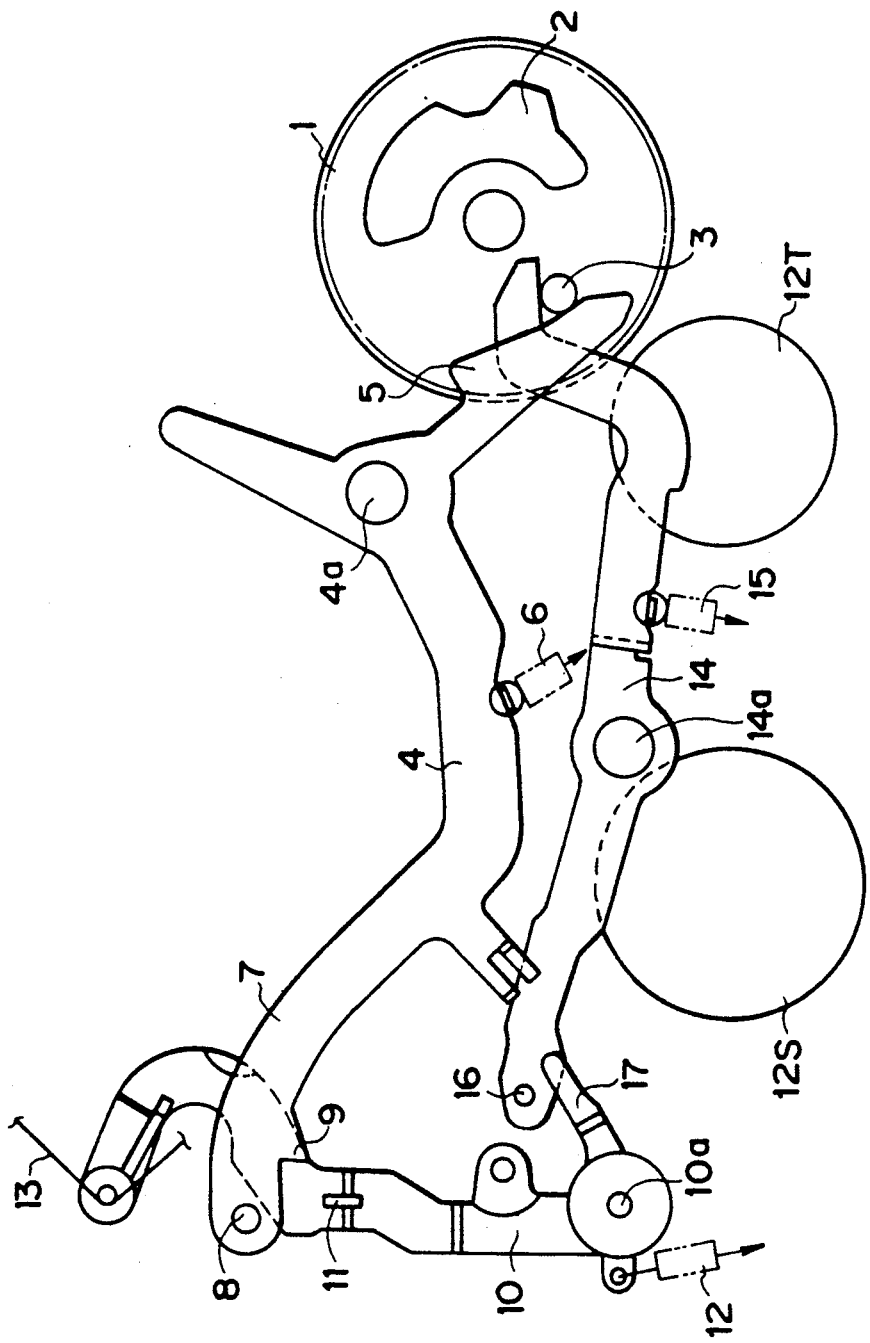
FIGS. 1 through 3 are plan views showing a tape tension mechanism embodying the invention where

A tape tension mechanism embodying the invention is described below in detail, referring to the drawings.

FIG. 1 shows an inventive tape tension mechanism in a tape player including a rotary head. It should be noted, however, that the rotary head and a cassette are omitted from the drawings.

In FIG. 1, reference numeral 1 designates a mode cam gear including a slot cam 2 and a position regulating pin 3 and movable between different positions corresponding to respective tape modes. When the mode cam gear 1 is positioned in a play position shown in FIG. 1, its position regulating pin 3 positionally regulates a regulated arm 5 (lower right arm in the drawings) of a tension control member 4 to position it at a lower position in the drawing. When the mode cam gear 1 is positioned in stop and fast-winding modes shown in FIG. 2, it does not engage the tension control member 4. The mode cam gear 1 is configured so that its slot cam 2, for example, controls a reel brake.

Figure 2:
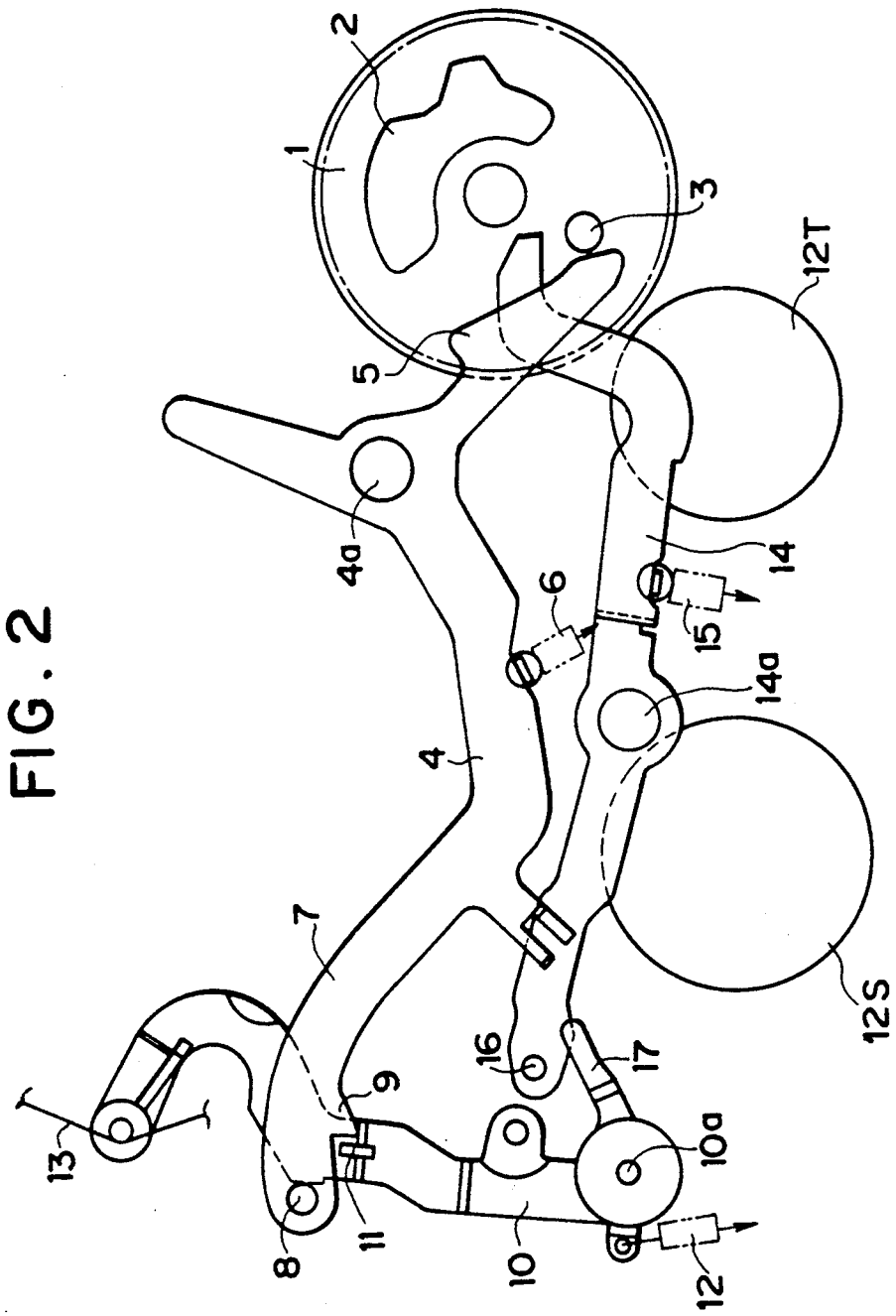

The tension control member 4 is pivotably supported by a pivot 4a. When the regulated arm 5 is urged by the position regulating pin 3 of the mode cam gear 1 as shown in FIG. 1, the tension control member 4 is pivoted in the clockwise direction to its non-control position, and when disengaged from the position regulating pin 3 of the mode cam gear 1 as shown in FIG. 2, the tension control member 4 is pivoted by a biasing force of a spring 6 in the counterclockwise direction to its control position.

At the distal end of a control arm 7 (left-hand arm in the drawings) of the tension control member 4 is provided a control pin (control portion) 8 and a pivoting regulating projection (regulating portion) 9. When the tension control member 4 is located at the control position shown in FIG. 2, the control pin 8 urges the left side of a tension member 10 to the right in the drawings to detach the tension member 10 from a tape 13, and the pivoting regulating projection 9 engages a regulated projection 11 of the tension member 10 to regulate the rightward pivoting amount of the tension member 10.

The tension member 10 is pivotably supported by a pivot 10a and biased by a tension spring 12 into contact with one surface of the tape 13. The tension member 10 is connected to a band brake or other brake system (not shown) and moves to an inner side of a track of a loading block in the tape unloading mode to control the rotation of a supply reel 12S in response to the pivoted position of the tension member 10 to maintain a constant contacting pressure of the tape 13 against the rotary head. Reference numeral 12T denotes a take-up reel.

Figure 3:
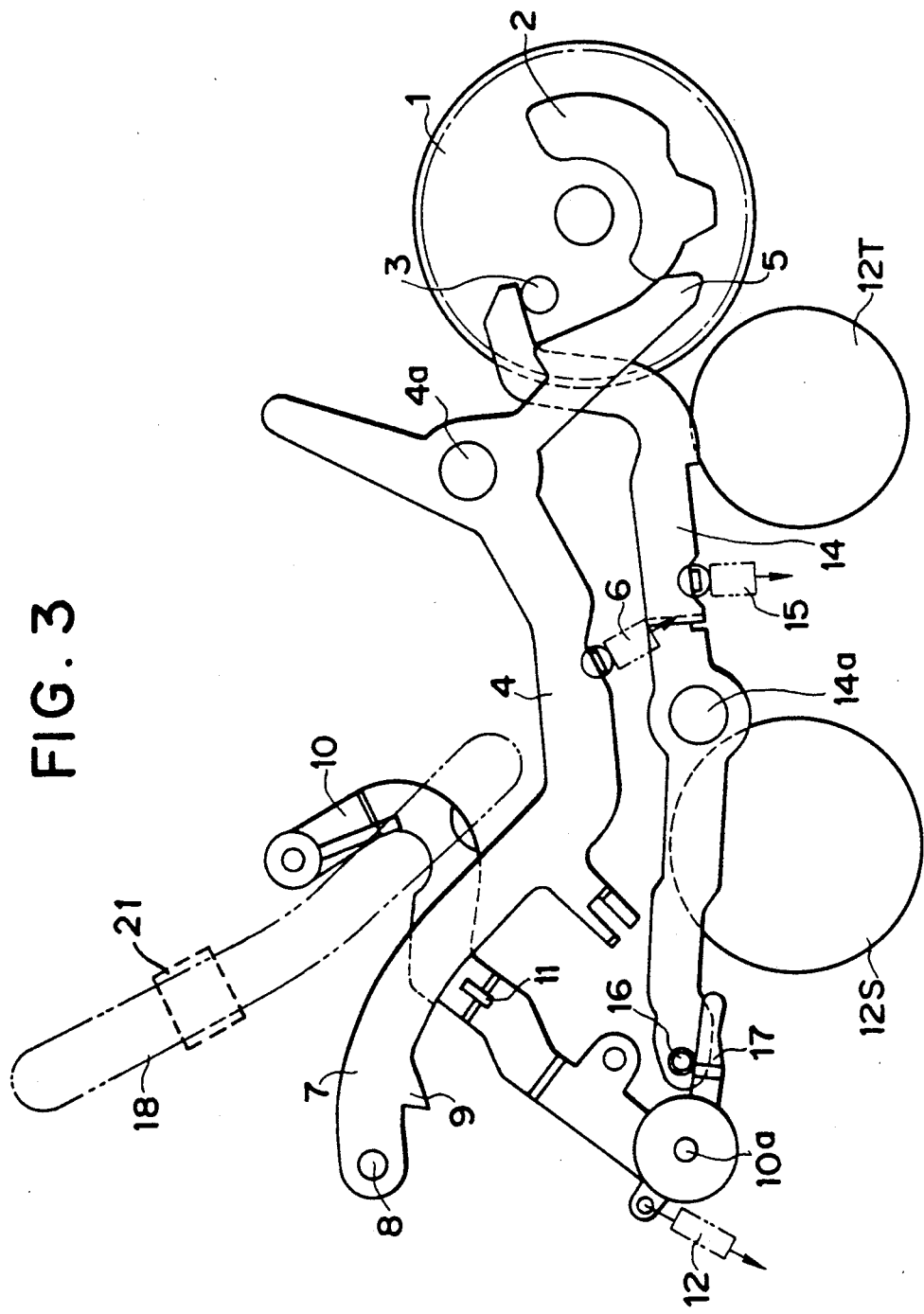

On the other hand, reference numeral 14 designates a tension release member pivotably supported by a pivot 14a. The tension release member 14 is positionally regulated by the position regulating pin 3 of the mode cam gear 1. More specifically, when the mode cam gear 1 is located at the stop or fast-winding position of FIG. 2, the tension release member 14 is held in a clockwise-rotated non-release position under a biasing force of a spring 15. Just when the mode cam gear 1 is moved to the play position, the tension release member 14 gets in engagement with the position regulating pin 3. After this, the tension release member 14 rotates in the counterclockwise release direction in response to a clockwise rotation of the mode cam gear 1. As shown in FIG. 3, just when the mode cam gear 1 reaches the tape unloading position, a release pin 16 thereof urges a released arm 17 of the tension member 10 to pivot it to a position intersecting a slot track 18 where a loading block 21 moves therealong.

The embodiment having the aforegoing arrangement operates as described below.

First referring to FIG. 1, in the play mode, regulating pin 3 of the mode cam gear 1 urges the regulated arm 5 of the tension control member 4 to locate the tension control member 4 at the clockwise-rotated non-control position. Therefore, the control pin 8 of the tension control member 4 does not urge the tension member 10 so that the tension member 10 is biased by the spring 6 into contact with the tape under a constant pressure. Therefore, in response to the pivoting position of the tension member 10, the supply reel 12S is controlled in rotation, and a constant contacting pressure is maintained between the tape 13 and the rotary head.

Referring to FIG. 2, in the stop or fast-winding mode, the regulated arm 5 of the tension control member 4 is released from the position regulating pin 3 of the mode cam gear 1. Therefore, the tension control member 4 is permitted to take the counterclockwise-rotated control position under the energy of the spring 6. As a result, the tension member 10 is urged by the control pin 8 of the tension control member 4 from the left in the drawings and controlled in the direction away from the tape. In this case, the tension force in the fast-winding mode is larger than in the play mode and often overcomes the spring for the tension member 10 and permits the tension member 10 to pivot largely. However, this embodiment reliably regulates the pivoting amount of the tension member 10 as shown in FIG. 2, using the pivoting regulating projection 9 of the tension control member 4.

As described above, according to the invention, while the tension control arrangement which was complicated in most prior art proposals is significantly simplified to two-member arrangement using the mode cam gear 1 and the tension control member 4 alone, it ensures reliable appropriate controls of the tension member in the play, stop and fast-winding modes. Particularly, since the mode cam gear 1 is not exclusive for the tension control arrangement but commonly used also for another function related to mode changes such as reel brake control arrangement, what is exclusive to the tension control arrangement is the tension control member 4 alone. Therefore, the arrangement is greatly simplified as compared to the prior art arrangement.

Figure 4:
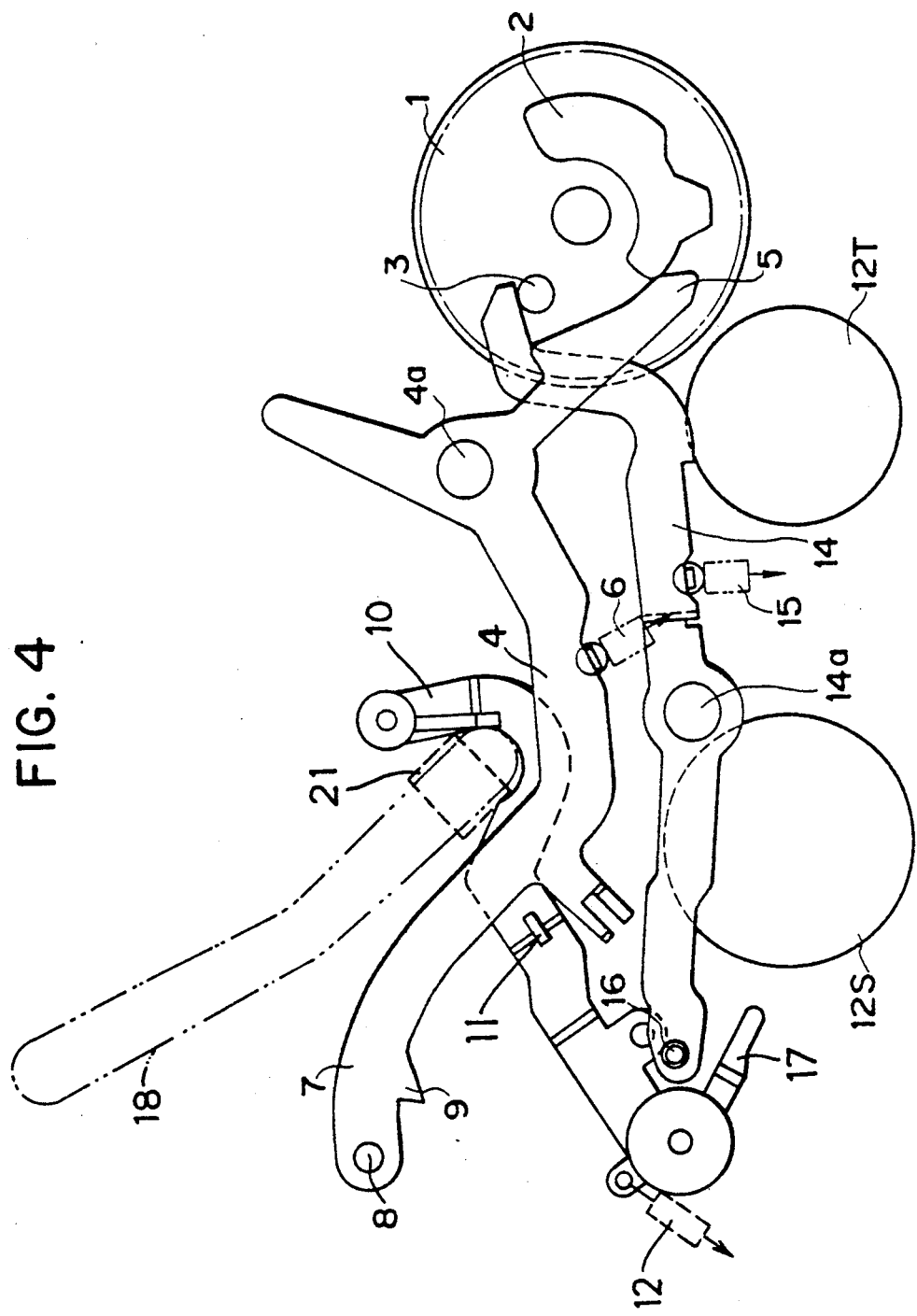

On the other hand, in the tape unloading mode shown in FIG. 3, when the tension release member 14 pivots in the counterclockwise direction, the release pin 16 at the distal end thereof urges the released arm 17 of the tension member 10 to pivot it. As a result, the tension member 10 moves to a position intersecting the slot track 18 for the loading block 21. After this, the tension member 10 is urged to a further backward position by the retracting loading 21 and reaches the tape unloading position together with the block as shown in FIG. 4. That is, since the tension member 10 is driven by the loading block 21, no particular driving system exclusive for the tension member 10 is not required. This also contributes to simplification of the arrangement and power saving.

The invention is not limited to the illustrated embodiment, but may be modified in some respects: configurations of the tension control member; its control and regulating portions; and engaging arrangement between the mode cam gear and the tension control member. Further, since the invention is directed to a control of the tension member, regarding its peripheral arrangements such as reel control action of the tension member, driving system for the tension member, etc., any appropriate arrangements may be selected. Beside this, in lieu of the mode cam gear, any arrangement capable of changing the position in response to various different modes such as play, stop, fast-winding, etc. may be used.

As described above, according to the invention, the use of the mode cam gear or other mode member for changing the modes of the reel brake, etc., in combination with the tension control member, ensures a proper, reliable control of the tension member and contributes to a significant simplification of the arrangement as compared to the prior art mechanism.

What is claimed is:

1. A tape tension mechanism for a tape player configured to guide a tape along a rotary head to play the tape, comprising: a pivotally supported tension member movable between first and second positions through a third position therebetween and biased by a spring force toward said second position into contact with one surface of the tape, and a supply reel controlled in rotation in response to a position of the tension member to establish a constant contacting pressure between the tape and the rotary head; a mode member movable between different positions corresponding to respective operational modes; a pivotally supported tension control member moved by said mode member to a control position in stop and fast-winding modes and to a non-control position in a play mode; a control portion which is provided on said tension control member, and which engages said tension member as said tension control member is moved to said control position and moves said tension member in a direction away from said second position and said tape, said control portion being disengaged from said tension member when said tension control member is in said non-control position; a regulating portion which is provided on said tension control member and which is engageable with said tension member when said tension control member is in said control position to limit pivoting of said tension member in said direction; and a tension release member which is engageable with said mode member and is moved by said mode member to a release position in a tape unloading mode so that said tension release member engages said tension member and moves said tension member from said second position to said third position in which a portion of said tension member is disposed along a path of movement of a movably supported loading block, wherein as said loading block moves along said path of movement when said portion of said tension member is in said third position and disposed along said path of movement, said loading block engages said portion and effects further pivoting of said tension member from said third position to said first position.

2. A tape tension mechanism according to claim 1, wherein movement of said tension release member is pivotal movement, wherein said tension member includes a release arm, and wherein said tension release member has a pin which engages said release arm of said tension member and pivots said tension member in response to pivotal movement of said tension release member.

3. A tape tension mechanism according to claim 1, wherein said mode member is supported for rotation about an axis and has a position regulating pin at a location spaced radially from said axis, said position regulating pin being engageable with said tension control member and said tension release member for effecting movement thereof.

4. A tape tension mechanism according to claim 1, including first resilient means yieldably urging said tension control member toward said control position, and said resilient means yieldably urging said tension release member in a direction away from said release position.

5. A tape tension mechanism according to claim 1, wherein said control portion on said tension control member is a control pin, said control pin engaging a surface provided on said tension member.

6. A tape tension mechanism according to claim 1, wherein said tension member has thereon a regulating projection, said regulating projection being engageable with said regulating portion of said tension control member to effect said limiting of pivotal movement of said tension member in said direction.

7. A tape tension mechanism according to claim 1, wherein said control portion of said tension control member is a control pin and is spaced from said regulating portion thereon.

* * * * *

UNITED STATES PATENT AND TRADEMARK OFFICE
CERTIFICATE OF CORRECTION

PATENT NO. : 5 031 056
DATED : July 9, 1991
INVENTOR(S) : Hitoshi OKADA et al

It is certified that error appears in the above-identified patent and that said Letters Patent is hereby corrected as shown below:

```
Column 6, line 11; replace "said" (first occurrence) with
                ---second---.
```

Signed and Sealed this

Third Day of November, 1992

Attest:

DOUGLAS B. COMER

Attesting Officer

Acting Commissioner of Patents and Trademarks